US007895154B2

(12) United States Patent
Newman et al.

(10) Patent No.: US 7,895,154 B2
(45) Date of Patent: Feb. 22, 2011

(54) COMMUNICATION REPUTATION

(75) Inventors: Ben Newman, Seattle, WA (US); Jose M De Oliveira, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 426 days.

(21) Appl. No.: 11/692,865

(22) Filed: Mar. 28, 2007

(65) Prior Publication Data
US 2008/0243920 A1 Oct. 2, 2008

(51) Int. Cl.
*G06F 7/00* (2006.01)
*G06F 17/00* (2006.01)
(52) U.S. Cl. ...................................................... 707/609
(58) Field of Classification Search ........................ None
See application file for complete search history.

(56) References Cited

U.S. PATENT DOCUMENTS

| | | | |
|---|---|---|---|
| 5,379,307 A * | 1/1995 | Ishibashi et al. ............... 714/48 |
| 6,198,812 B1 | 3/2001 | Weber | |
| 6,353,663 B1 | 3/2002 | Stevens et al. | |
| 6,748,422 B2 * | 6/2004 | Morin et al. ................. 709/206 |
| 6,925,162 B1 | 8/2005 | Porter et al. | |
| 7,068,761 B2 | 6/2006 | Latter et al. | |
| 7,127,050 B2 | 10/2006 | Walsh et al. | |
| 7,136,472 B2 | 11/2006 | Hill et al. | |
| 7,562,304 B2 * | 7/2009 | Dixon et al. ................. 715/738 |
| 2003/0072426 A1 | 4/2003 | Davidson et al. | |
| 2005/0201363 A1 | 9/2005 | Gilchrist et al. | |
| 2005/0227678 A1 | 10/2005 | Agrawal et al. | |
| 2006/0015937 A1 | 1/2006 | Illowsky et al. | |
| 2006/0173741 A1 * | 8/2006 | Marshal ....................... 705/14 |
| 2006/0233320 A1 | 10/2006 | Latter et al. | |
| 2006/0293057 A1 | 12/2006 | Mazerski et al. | |

OTHER PUBLICATIONS

Gates et al, Microsoft Windows, Microsoft, 3.11-Vista.*
Gates et al, Windows XP Sound Control Panel, Aug. 24, 2001, Microsoft, XP.*
Bekman, Anti-Spam Techniques: Reputation Control, HTML, May 15, 2006, stason.org, http://stason.org/articles/technology/email/junk-mail/reputation_control.html.*
"Phone Call Filter 1.0", Jan. 11, 2007, at << http://www.cleansofts.com/get/860/3616/Phone_Calls_Filter.html>>, pp. 1-3.
"PhoneTray Free", Jan. 11, 2007, at << http://www.filesland.com/compainies/TraySoft-Inc/PhoneTray-Free.html>>, FilesLand.com, 2003-2007, pp. 1-2.
"RCN-Connect to Something More", Jan. 1, 2007, at <<http://www.rcn.com/phone/features/features_privacy.php>>, RCN Corporation, 2007 pp. 1-2.
"Screen Machine—Telemarketer and Unwanted Call Blocker", Jan. 11, 2007, at<< http://www.familysafemedia.com/screen_machine_telemarketer_ca.html>>, Nextphase, 1998-2007, pp. 1-5.

* cited by examiner

*Primary Examiner*—Pierre M Vital
*Assistant Examiner*—Jason Liao
(74) *Attorney, Agent, or Firm*—Lee & Hayes, PLLC

(57) ABSTRACT

Techniques are described which may provide information regarding the end point's reputation, for presentation, or selectively block communications according to user preferences. In an implementation, a request to establish a communication link may include searching a database of reputation data for information regarding at least one of the source's reputation data or the intended receiver's reputation data.

20 Claims, 3 Drawing Sheets

COMMUNICATION REPUTATION

BACKGROUND

Telephony and text messaging is becoming increasingly widespread. In addition to fixed location communication systems, mobile communication devices allow users to remain in near continual communication throughout his/her daily life. Many devices, such as mobile telephone communication devices, may additionally permit textual communication, such as "text messaging" (TM) or "instant messaging" (IM), which may further ease user communication.

While increased communication connectivity is beneficial, unwanted interruptions may intrude on a user's daily life. For example, a user may wish to avoid certain types of communications such as, sales calls; text messages for goods or services; adult content; calls or messages which are of a dubious nature (i.e., known or suspected scams) or may result in a fee (a "900" number or a fee based IM). In other situations, a user may be hesitant to communicate with an unknown party.

Limited information exists to avoid unwanted communications or be aware of a communicant's status. A prime example of this problem is a telephone call which is received during dinnertime. Even if the user subscribes to "caller id," which provides the user with the telephone number associated with the communication, this information may be of limited use in deciding whether to "pickup" or complete the call. Additionally, persons attempting to defraud a user may implement a variety of techniques to avoid revealing his/her identity. A party attempting to implement a telephone scam may use numerous telephone numbers and aliases to minimize detection.

As a result, a user may be hesitant to communicate with an inbound call or other communication because he/she is not sure if the other party is legitimate. For instance, a caller may ask to call back a credit card company, at the phone number provided on the credit card, rather than risk divulging information to a party establishing an inbound communication.

Outbound communications are also subject to similar problems. Some users may avoid contacting legitimate businesses/institutions in an attempt to avoid being defrauded. The foregoing situation may be exemplified by senior citizens and other portions of the population which are increasingly the targets of fraudulent communications. For instance, a $3^{rd}$ party may attempt to establish a "phony" toll-free number to lure unsuspecting users into divulging financial or personal information which is subsequently used in a fraudulent manner. Other forms of communication, such as mail solicitation, television commercials, may be implemented in order to direct users to contact these phony numbers.

SUMMARY

Techniques are described which may provide information regarding the end point's reputation, for presentation, or selectively block communications according to user preferences. In an implementation, a request to establish a communication link may include searching a database of reputation data for information regarding at least one of the source's or the intended receiver's reputation data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Accordingly, techniques are described to provide reputation data to a communication end point to prevent communication, present reputation information, and so on. For example, prior to a phone call being completed, an end point is presented with reputation data associated with the source of the call. In the present discussion, a communication end point may be a communication source or a communication intended receiver/receiver. The techniques described herein may be applicable to inbound and outbound directed communications. While telephonic (voice "land line") communication is primarily discussed, the techniques, software/hardware and system are additionally applicable to mobile telephone communication (including cellular telephone communication), instant messaging, text messaging, voice messaging, and facsimile communication. Examples of telephone communication may include land lines, cellular communications, as well as, voice over internet protocol communications (VoIP).

In an implementations, techniques are described in which reputation data is provided to a source and/or an intended receiver as part of a request to complete a communication link. A database is searched to obtain reputation data associated with one of the end points to the intended communication. For example, at least a portion of a caller's reputation may be presented to the intended recipient as a visual display or audible cue, so that the recipient may better understand the caller's (end point) reputation.

In the following discussion, exemplary environments are first described that are operable to provide communication end point reputation to another communication endpoint. For example, the reputation of a call's source is provided to an intended receiver. For outbound communications, a communication source may be provided with reputation data associated with the intended receiver. For example, an audible message may be presented to warn the caller that the intended recipient has a "suspicious" reputation. The provided communication end point reputation may be used to block a requested communication, or may be presented to another end point, and so on.

Exemplary Environment

Figure 1:
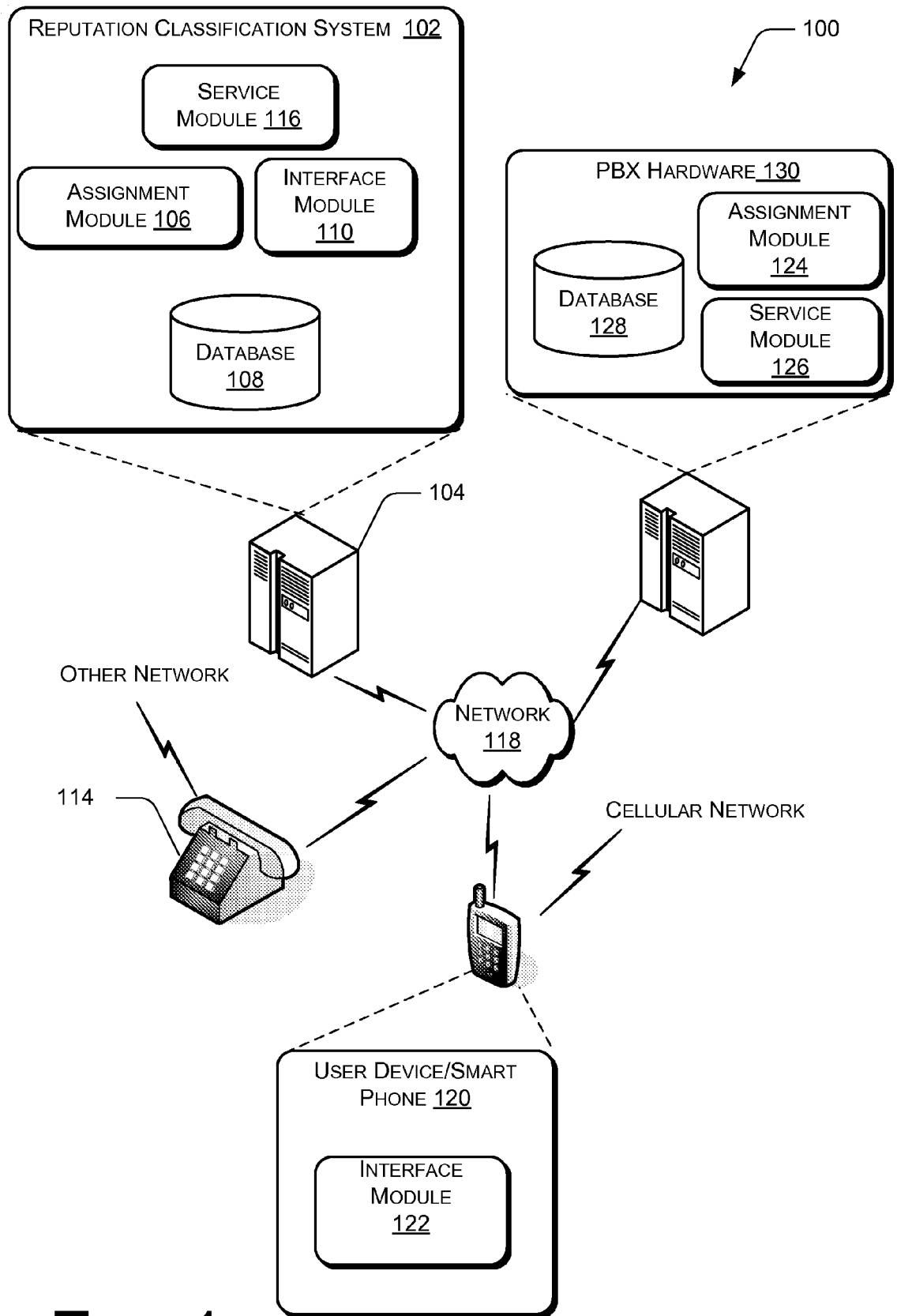
FIG. 1 illustrates an environment in an exemplary implementation that may use technologies to provide communication reputation data.

FIG. 1 illustrates an environment 100 in an exemplary implementation that is operable to employ a reputation classification system 102. An assignment module 106 may be included in the reputation classification system 102. As illustrated, the reputation classification system 102 is resident on a computing device 104 which is remote from the communication request. The assignment module 106 may accept user feedback information and usage information to generate reputation data associated with a communication end point.

The assignment module 106 may be configured to collect data and assign reputation and classification to a communication end point. For instance, after a predetermined number of short duration phone calls and reports from clients, indicating the conversation was "financial" in nature and "suspicious," the assignment module 106 assigns the communication source a "solicitor" classification. This assignment may be based on usage, reported reputation or a combination thereof. The source also may be assigned a "suspicious" reputation.

Assigned reputation data, including the end point classification, may be stored in a database 108. The assignment module 106 may forward additional reputation data to the database 108 for storage. For example, the assignment module 106 may send reputation data regarding how the classification and reputation determination was made. Examples may include an agency reporting the end point, a "large" group of users (in comparison to other end point reputation data stored in the database 108) reporting similar reputation information and classification information, a "small" group (in comparison to other reputation data stored in the database 108) reporting an "egregious" reputation information and an "offensive" classification information, and so on. The database may be arranged in a hierarchical configuration to promote efficient searching. For example, a database for telephone communication end points may be arranged according to "area code" and "prefix."

Other reputation data may include date stamps, an identity (such as a phone number), how many users are associated with an identifier (such as a telephone number), communication history, reputation data to aid data analysis, evidence to support an assigned reputation, and so on. The assignment module 106 may integrate user feedback information and usage information to maintain reputation data for the communication request source or intended receiver/receiver.

In specific implementations, reputation data includes a scaled value for a reputation and a classification. A reputation scale may range from "good" or "trustworthy" to "suspicious" to "bad." Correspondingly, the different reputation descriptors may be associated with numerical ranges. For instance, a "bad" input may be assigned a higher scale value than a "suspicious" ranking. Implementing a scale may permit weighting feedback and other analysis. For example, "bad" reputation feedback may be weighted more than a "good" reputation feedback. Classifications may include, but are not limited to, solicitations, pay services, adult content, and so on. Multiple classifications may be applied. For example, an adult end point having a fee component, may be assigned an "adult" and a "fee service" classification. The classifications may be scaled as well.

Different reputations and classifications schemes may be utilized for end points associated with minors. For example, the assignment module 106 may assign additional or different factors as part of the reputation data for use with an end point associated with a minor. The reputation classification system 102 as described herein may permit "parental control" thorough use of assigned reputation data.

The assignment module 106 may obtain feedback information from an interface module 110 associated with a communication end point. For example, at the end of a telephone conversation, the receiver may input reputation feedback information associated with the source of the call. For instance, a user may input data via a web page using a check box, an adjustable indicator, and so on.

In possible implementations, the interface module 110 is accessed as a web page on which the user may input data associated with the communication. For example, a user may interact with the interface module 110 to classify a communication requesting a donation as a "financial solicitation." Further, the user may assign a "suspicious" reputation to the source end point.

In other implementations, the interface module 110 is included in a communication device. For example, a user may navigate a screen included on a land line phone 114 to input reputation data. For text messages, a user may submit a text message, to the interface module 110, regarding the reputation of the party sending an original text message. For devices with limited functionality (for data to be entered), the interface module 110 may accommodate telephone inputs. For instance, a user may call an established toll free number to input reputation data.

The interface module 110 may request a password to access data, report a reputation or access other features. This may permit a parent to exercise control over a common communication device or tailor a communication device specifically for a minor.

The reputation classification system 102 may include a service module 116. The service module 116 may forward usage information to the assignment module 106. For example, a usage pattern is forwarded to the assignment module 106 for incorporation into reputation data. Thus, the service module 116 may identify an end point making numerous short duration phone calls, to the assignment module 106. Usage information may include, but is not limited to, identifying an end point which routinely communicates with particular segments of the population. For example, social engineering "campaigns" may contact numerous devices associated with users belonging to a particular group. Common targets may include senior citizens, people who contributed to organizations, people residing in particular areas, and so on.

In additional implementations, reputation data may be integrated from other communication formats. Thus, reputation data derived from other communications mediums may be incorporated into reputation data for the relevant medium. For example, a user may report a telephone number associated with a physical mail solicitation to the interface module 110 for consideration in determining a telephone reputation. In other instances, the service module 116 may block a telephone communication from a telephone number associated with an email "SPAM" campaign. In contrast, a communication end point which is related to a well characterized communication end point (such as a highly trafficked corporate web site) in another communication format may be assigned a reputation and classification based at least partially on the reputation data characteristics for the other communication medium. For example, a telephone number associated with a highly trafficked corporate or government web site is assigned a "verified" telephone reputation based on the communication characteristics associated with the Web traffic.

In further implementations, the service module 116 blocks or presents reputation data based on learned user preferences. The service module 116 may block the communication if one or more criteria are met. Criteria may include a portion of the reputation data stored in the database 108. For example, the service module 116 may block communications from an end point having with a "fee" classification. Blocking may be achieved by the communication device querying the service module 116 via a simple object access protocol (SOAP). For example, the communication device may access the service module 116 by a SOAP request.

The service module 116 may allow passive blocking of communication requests based on learned user preferences. For example, the service module 116 may block communications having reputation characteristic(s) similar to those the user has previously blocked, reported unfavorable reputation data, ended the communication quickly, and so on. The service module 116 may apply a heuristic determination of previous user inputs and usage to determine whether to permit the call or present reputation data.

If, for example, a communication is from a "questionable" end point, the service module 116 provides at least a portion of the reputation data based on the assigned reputation, if a user has previously requested reputation data for "questionable" end points. The service module 116 may block a communication from a "bad" end point, if the user has previously blocked calls from other "bad" end points. For outbound communications the service module 116 may present an audible warning of the end point's reputation data. The service module 116 may adaptively learn which communication requests to block, or present data for, as a result of user preference changes. For example, if a user repeatedly blocks a "questionable" end point the service module 116 may block similar end points. Further, if a user has several outbound communications with "questionable" end points the service module 116 may raise the threshold for incoming calls. The user may configure the interface module 110 to override the service module 116 as desired.

In other instances, the user may override the passive blocking by applying user selected rules. A user may turn off passive blocking, rather than risk blocking a desired communication. Further, the user may interact with the service module 116 by adjusting the level at which passive blocking is applied. The user may do this by accessing the service module 116 through the interface module 110.

In further implementations, the service module 116 may include an address book of acceptable communication end points. Alternatively, the address book may be maintained in the database 108 as well. In this manner, the service module 116 may search the address book prior to searching reputation data. For example, the service module may include a list of acceptable communication sources, for the intended receiver, so that a communication from a family member is passed through without searching for the source's reputation.

Depending on the reputation classification system 102 configuration, the system components and the communication devices may communicate via a network 118 or multiple networks. For example, the network 118 is the "Internet," or the "World Wide Web," while the communication request and subsequent communication occur over a separate land line network. In the case of a Voice over Internet Protocol telephone communication (VoIP), the Internet may be utilized for both the voice communication and communications for the reputation classification system components. In the case of a text messaging system, a cell phone or a smart phone 120, a cellular network may be included. For example, communication requests may be passed over a wireless cellular link, while communications between the smart phone and the reputation classification system 102 occur over the cellular network and the Internet.

While the Internet is referenced throughout the previous discussion, other networks are suitable as well. For example, the network may include a wide area network (WAN), a local area network (LAN), a wireless network, a public telephone network, an intranet, and so on. Although a network is shown, the network may be configured to include multiple sub-networks or multiple different networks.

In further cases, a reputation classification system may be partially maintained on a device functioning as a communication end point. For example, the user module and the interface module 110 may be included on a smart phone to interact with a database 108 maintained by a computing device 104.

Other configurations are contemplated as well. For example, the interface module 122 may reside on an end point device (such as the smart phone 120), while the assignment module 124 and the service module 126 and database 128 reside on private branch exchange hardware 130.

Generally, any of the functions described herein can be implemented using software, firmware, hardware (e.g., fixed logic circuitry), manual processing, or a combination of these implementations. The terms "module," "functionality," and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer readable memory devices, e.g., memory.

The following discussion describes transformation techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks.

Exemplary Procedures

The following discussion describes a methodology that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. A variety of other examples are also contemplated.

Figure 2:
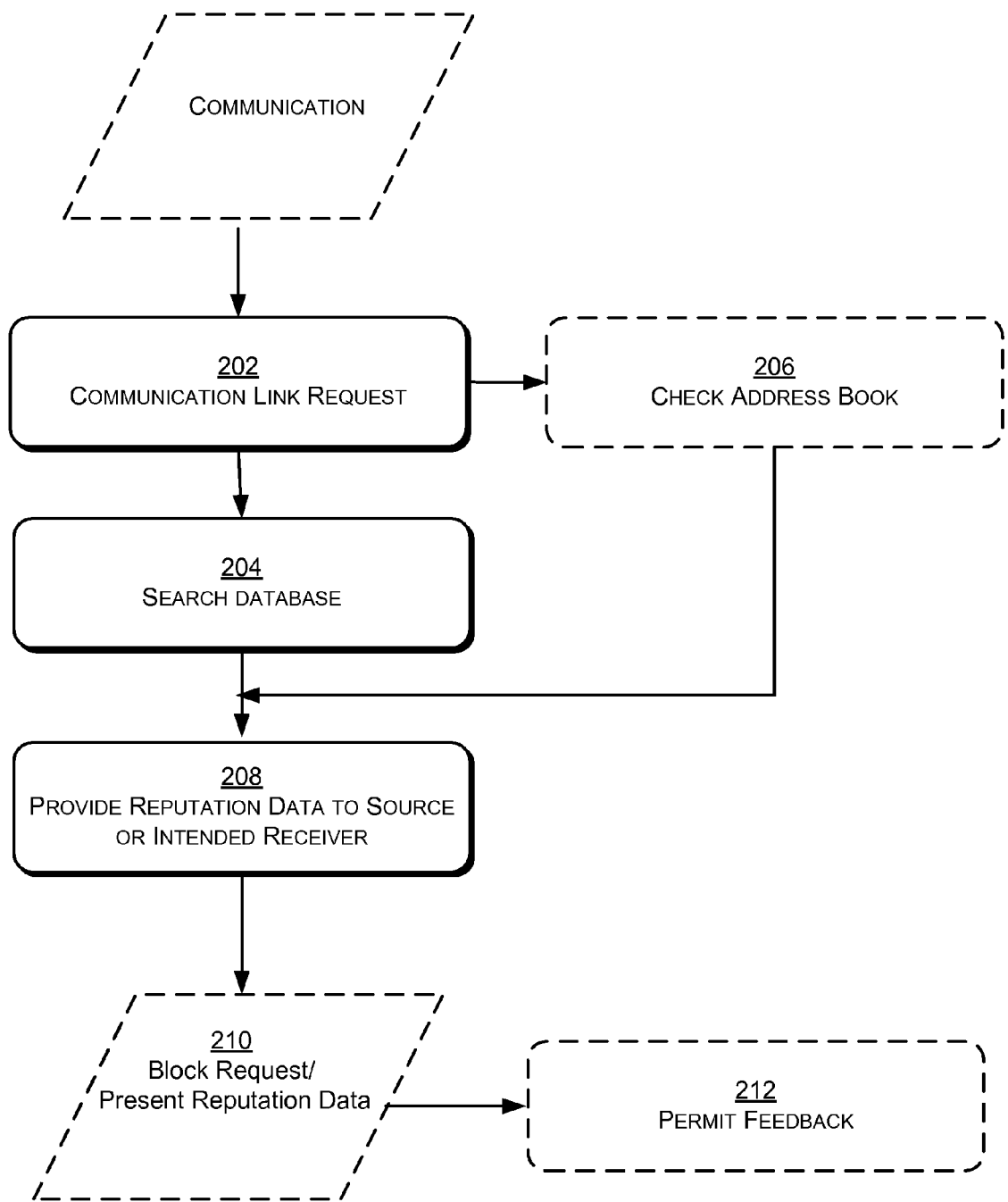
FIG. 2 is a flow diagram depicting a procedure in an exemplary implementation in which reputation data is provided to a source or an intended receiver.

FIG. 2 discloses an exemplary procedure of reputation communication filtering. The procedure may include requesting 202 establishment of a communication link between a source and an intended receiver/receiver. Examples of communication link requests include placing a telephone call or facsimile by dialing a telephone number, transmitting a text message, and so on. The communication link request may be issued over a dedicated network. For instance, an incoming communication request may be issued over a land line network.

A database including reputation data may be searched 204 for reputation data associated with the source of the communication, the intended receiver or combinations thereof. The procedure may include searching a database of reputation data associated with a physical device used in the communication request. Reputation data may include at least a reputation and a classification for a source, an intended receiver/receiver. A list or address book of acceptable communication sources/intended receiver may be checked 206 so that the communication link is connected without having to search for reputation data. For example, the procedure may include searching the user's "acceptable" address book prior to searching for reputation data. If an end point is included in the address book the communication may be permitted without searching the database. Thus, database searching may be avoided for communication end points occurring in the address book. Personalized information associated with the communication end point in the address book may be provided.

Searching may be initiated by forwarding the search request from the communication device to a remote server. For example, a facsimile machine forwards a search request to a remote computer prior to connecting the facsimile call. In this case, the fax may implement a SOAP communication with a remote server which searches the database. This search request may be made over a separate network than the network on which the communication request was received.

In further examples, the communication request is intercepted by intermediate device which requests a search prior to completing the communication link with the intended device. For example, a PBX exchange device searches a database including reputation data before the call is completed to the intended receiver. In this instance, as well as others, the intermediate device may at least partially communicate over the network on which the original communication request was placed.

If a match is obtained, the matched reputation data may be provided 208 to the source or the intended receiver. For example, the obtained reputation data may be provided to a smart phone for visual presentation 210 or as audible cue. In the case of an intermediate device, the reputation data may be forwarded through the intermediate device and then to the end communication device.

If the obtained reputation data meets a "block" criteria, the communication request may be blocked 210 without displaying the reputation data. In other instances, the reputation data is displayed, but the communication link is not completed. A log of blocked communication requests may be maintained. For example, the reputation data may be retained in a "blocked" log for user observation.

In other instances, reputation data is presented if one or more criteria are met. Exemplary criteria include adult content, a verified charity, a scalar reputation value, classification, financial solicitation and so on. If, for instance, a call is "questionable" the procedure may include presenting a portion of the data as a warning, while a "bad" source is blocked without display. Pre-selected ring tones may be used to alert the user of a blocked call.

An adjustable threshold may be set to determine when blocking or display of reputation data is appropriate. For example, a heuristic user preference determination may be used to reset a "block" threshold level. Other learning techniques are available as well. For instance, a system implementing the present process may passively block communications unless overridden by the user.

The procedure may include accepting user feedback 212. User feedback may include providing reputation information, classification information and so on. User feedback may be obtained through a communication device, accessed over the Internet and so on.

Feedback may be solicited at the end of a communication resulting from the communication request. For a land line phone, a user may be prompted to enter data via an input on the device, call a "toll-free" (or other) number or access a web page. In another example, a user is asked to text feedback.

Figure 3:
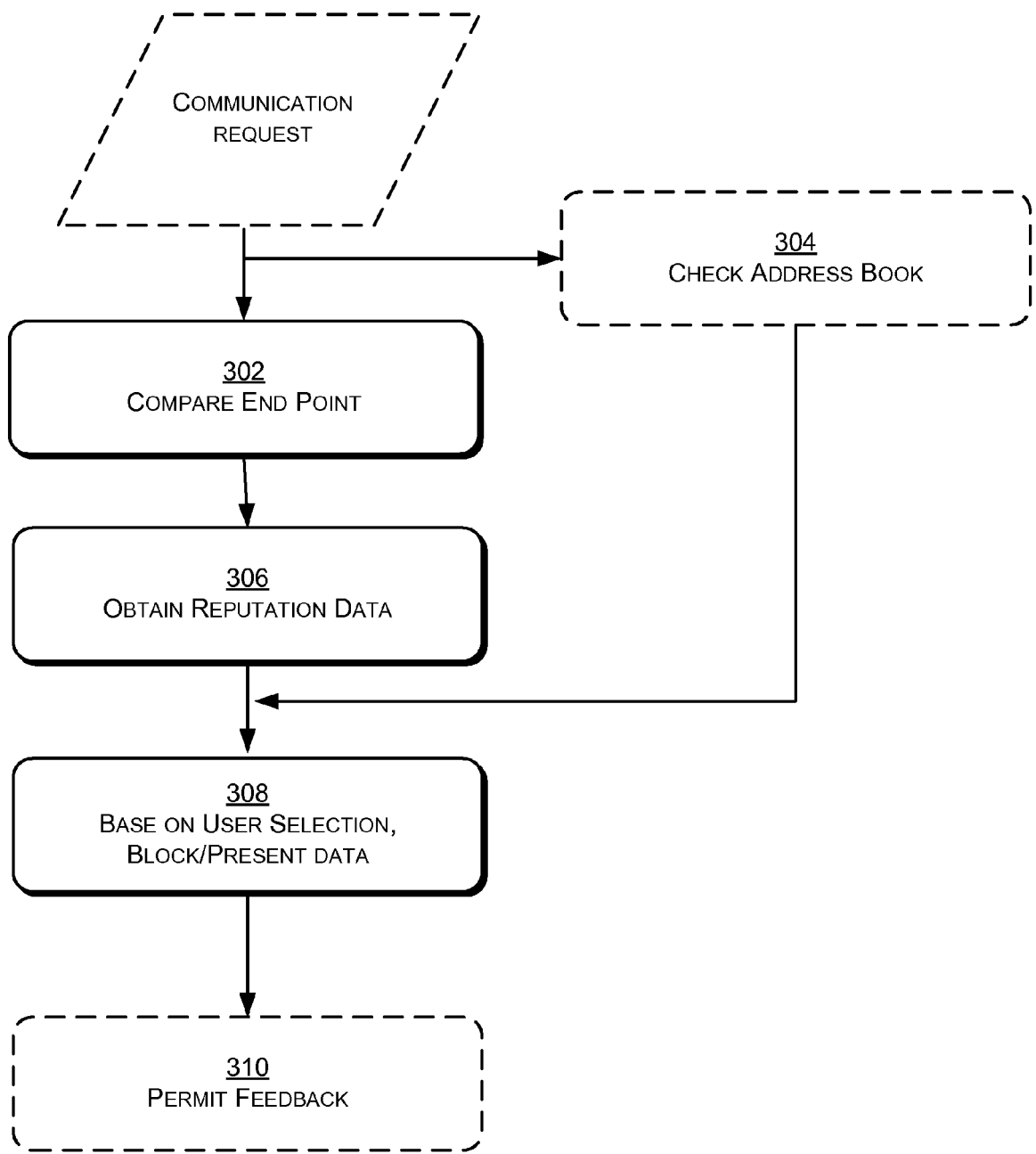
FIG. 3 is a flow diagram depicting a procedure in an exemplary implementation in which reputation data is implemented to block communication or present reputation data.

Referring to FIG. 3, a procedure and computer readable-media including computer-executable instructions that may direct a computer to perform the disclosed procedure are discussed. The procedure may include comparing 302 an end point with a database. For example, the telephone number from which a telephone call is placed is compared to reputation data associated with telephone numbers stored in the database. Optionally, an "address book" of acceptable communication end points may be maintained so comparing may be bypassed, if the end point matches an acceptable end point maintained in the address book.

The database may include reputation data associated with a communication end point. For instance, the database may include reputation information and classification information for an identified end point. For instance, a call placed from (509) 555-1212 is compared to the database. If the telephone number is matched, the associated reputation (such as "suspicious") and the classification (such as "financial solicitation") maintained in the database are retrieved.

Other information may be included in the reputation data. Other reputation data may include how the reputation was determined, an identity, a number of users associated with an identifier (such as a phone number), date stamps, communication history, reputation data to aid data analysis, evidence to support an assigned reputation, and so on. For example, a database record of reputation data may include the following information.

TABLE 1

| | | | Database Record | | | |
|---|---|---|---|---|---|---|
| Area Code | Prefix | Number | Reputation | Classification | Reported | Misc. |
| 509 | 555 | 1212 | questionable | solicitation | individuals | calls at dinner time |

Comparing may be done in response to a communication request. For example, a database search is initiated in response to a source placing a telephone call or sending a text message. If a delay occurs in completing the communication link, a message may be presented to explain the delay. The message may function as an additional deterrent for unsolicited calls. The database may be maintained by a third party. For example, a telephone company or a cellular telephone service provider. In other instances, service provider or organization may maintain the database.

The reputation data obtained 306 from the comparison, may be forwarded to a service module for use 308 with learned blocking rules or user defined rules based on user selection. The communication request may be blocked 308 based on a heuristic determination of user preferences. For instance, although additional reputation data is maintained in the database, only a portion of the maintained reputation data may be used in response to the search. For example, additional information is not retrieved based on user preferences, display capability or communication blocking profiles.

In other instances, the obtained reputation data is implemented for display, presented as an audible cue, and so on. The obtained reputation data may be forwarded to a user interface associated with the communication device. Presenting reputation data similarly may based on learned user preferences (such as a heuristic determination), or on user applied rules.

Additionally, the procedure may include permitting 310 reputation feedback upon completion of a communication resulting from the communication request. For example, after a user has "viewed" a text message the user may be permitted to provide reputation feedback. In the case of a telephone call in which a source "leaves" a voice mail message a user may be permitted or perhaps, reminded via an audible message that he/she can provide reputation feedback. For example, the user may be prompted to "delete" the voice mail message and concurrently provide reputation feedback (e.g., a message stating "press 7 to delete and report as a financial solicitation").

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   requesting establishment of a communication link between a source and an intended receiver;
   searching a database, including reputation data and classification data, for reputation data associated with at least one of the source or the intended receiver;
     wherein the reputation data includes how the reputation was determined, a communication history, and evidence to support an assigned reputation;
     wherein the classification data includes a classification to a communication end point;
   reading physical mail;
   retrieving information from the physical mail;
   integrating information that is derived from the physical mail into the reputation data; and
   providing the reputation data to at least one of the source or the intended receiver, wherein the reputation data comprises a date stamp and a number of users associated with an identifier; and
   blocking the requested establishment of the communication link based on the classification associated with the communication end point.

2. A method as described in claim 1, wherein the communication link is selected from the group consisting of a telephone voice link, a text message link, a facsimile link, and an instant message link.

3. A method as described in claim 1, further comprising blocking the request to establish the communication link, if upon searching the database, a criterion is met.

4. A method as described in claim 3, wherein the criterion is a user adjustable threshold.

5. A method as described in claim 1, further comprising blocking the request to establish the communication link based on a heuristic determination of user reputation preferences.

6. A method as described in claim 1, wherein providing the reputation data includes presenting a visual cue of a portion of the reputation data.

7. A method as described in claim 1, further comprising soliciting reputation feedback at the end of a communication resulting from a communication request.

8. A method as described in claim 7, further comprising accepting user feedback at the end of the communication resulting from the communication request.

9. A method as described in claim 1, wherein the reputation data includes at least one of adult content, fee service, suspected fraud, verified financial service, usage, verified charity, scalar reputation value, classification, or financial solicitation.

10. One or more computer-readable media comprising computer-executable instructions that, when executed, direct a computing system to:
    in response to a communication request, compare an end point with a database storing reputation data and classification data,
      wherein the database includes reputation data on how a reputation was determined, a communication history, and evidence to support an assigned reputation;
      wherein the classification data includes a classification to a communication end point;
    obtain the reputation data associated with the communication end point;
    include a date stamp and a number of users associated with an identifier in the reputation data of the database;
    read physical mail;
    retrieve information from the physical mail;
    integrate information that is derived from the physical mail into the reputation data of the database; and
    based on user selection, utilize the obtained reputation data associated with the communication end point to at least block the communication request or present at least a portion of the obtained reputation data associated with the communication end point to a user.

11. The one or more computer-readable media as described in claim 10, wherein the reputation data of the database is scaled.

12. The one or more computer-readable media as described in claim 10, wherein the database is maintained by a third party to the communication request.

13. The one or more computer-readable media as described in claim 10, further comprising permit upon termination of a communication resulting from the communication request.

14. The one or more computer-readable media as described in claim 13, wherein the reputation feedback is provided to a web page.

15. The one or more computer-readable media as described in claim 10, wherein the reputation data of the database is presented audibly.

16. A system comprising:
    a memory;
    a processor coupled to the memory, the processor storing computer-executable instructions to perform acts;
    a database coupled to the processor, wherein the database includes reputation data on how a reputation was determined, a communication history, and evidence to support an assigned reputation;
    an interface module coupled to the processor to read physical mail;
    the interface module to retrieve information from the physical mail;
    the interface module to integrate information that is derived from the physical mail into the reputation data;
    an assignment module coupled to the processor including classification data to assign a classification to a communication end point;
    the assignment module to assign a reputation to the communication end point;
    a service module coupled to the processor to passively block a communication request or provide the reputation data associated with the communication end point based on the assigned reputation;

the database including the reputation data comprising a date stamp and a number of users associated with an identifier; and an interface module coupled to the processor to interface with the service module to apply user selected rules to the service module;

the service module coupled to the processor to further block the communication request based on the classification that is assigned to the communication end point.

17. The system of claim 16, wherein the service module forwards usage data to the assignment module.

18. The system of claim 16, wherein the interface module solicits user feedback at the end of a communication resulting from the communication request.

19. The system of claim 16, wherein the communication request is selected from the group consisting of a telephone voice request, a text message request, a facsimile request, and an instant message request.

20. The system of claim 16, wherein the reputation data of the database is presented at least one of audibly or visually.

* * * * *